May 18, 1954  F. A. SLACK, JR  2,678,470
POLYMERIZING METHOD
Filed Nov. 25, 1949  8 Sheets-Sheet 1
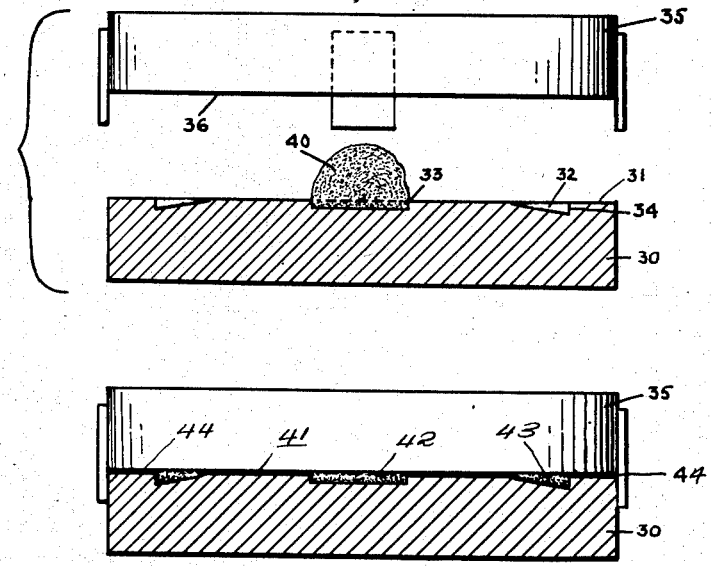
Fig. 1.
Fig. 2.
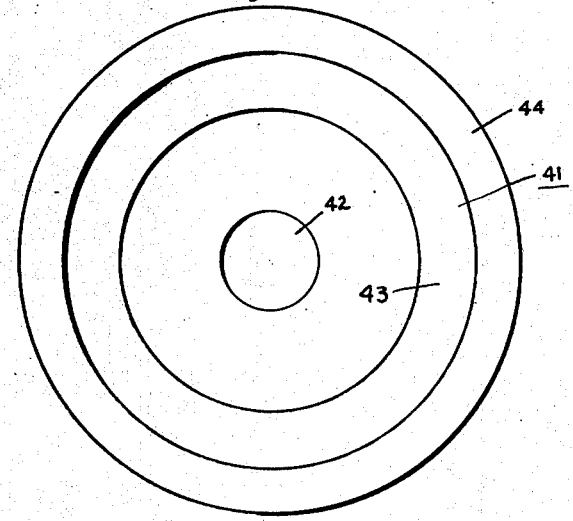
Fig. 3.
INVENTOR.
FRED A. SLACK, JR.
BY Barr, Borden & Fox
ATTORNEYS May 18, 1954  F. A. SLACK, JR  2,678,470
POLYMERIZING METHOD Filed Nov. 25, 1949  8 Sheets-Sheet 2

INVENTOR.
FRED A. SLACK, JR.
BY
Barr, Borden & Fox
ATTORNEYS

INVENTOR.
FRED A. SLACK, JR.
ATTORNEYS

May 18, 1954  F. A. SLACK, JR  2,678,470
POLYMERIZING METHOD

Filed Nov. 25, 1949  8 Sheets-Sheet 4

INVENTOR.
FRED A. SLACK, JR.

BY
Barr, Borden & Fox
ATTORNEYS

May 18, 1954  F. A. SLACK, JR  2,678,470
POLYMERIZING METHOD
Filed Nov. 25, 1949  8 Sheets-Sheet 5

INVENTOR.
FRED A. SLACK, JR.
BY
Barr, Borden & Fox
ATTORNEYS

May 18, 1954  F. A. SLACK, JR  2,678,470
POLYMERIZING METHOD
Filed Nov. 25, 1949  8 Sheets-Sheet 7
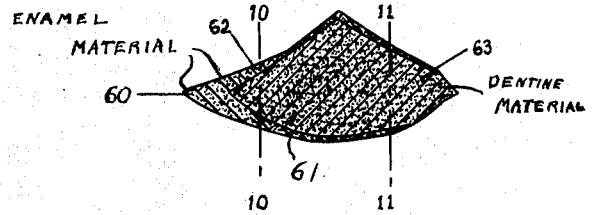
Fig. 9.
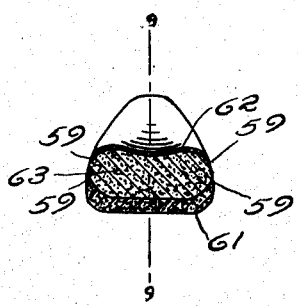
Fig. 10.  Fig. 12.  Fig. 11.
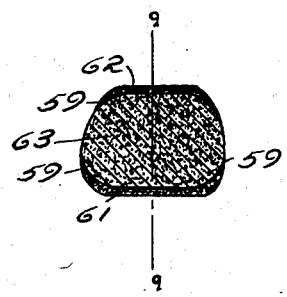
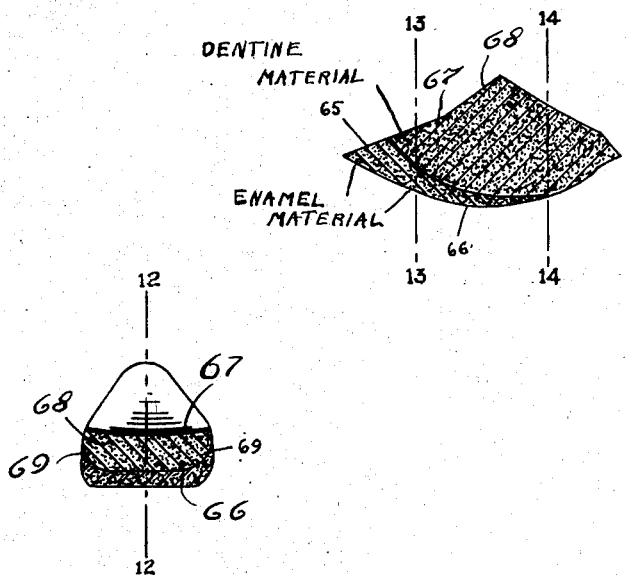
Fig. 14.
Fig. 13.
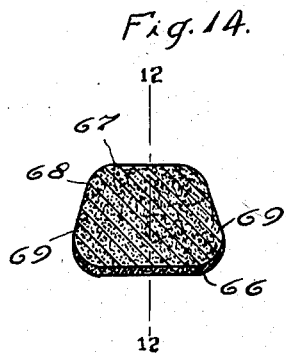
INVENTOR.
FRED A. SLACK, JR.
BY
Barr, Borden & Fox
ATTORNEYS Patented May 18, 1954

2,678,470

UNITED STATES PATENT OFFICE 2,678,470

POLYMERIZING METHOD

Fred A. Slack, Jr., Ardmore, Pa., assignor to H. D. Justi & Son, Inc., Philadelphia, Pa., a corporation of Pennsylvania Application November 25, 1949, Serial No. 129,446

10 Claims. (Cl. 18—55.1)

This invention relates to the production of polymerized articles having relatively blended multi-shaded visual aspects, as exemplified, for instance, in the simulation of a natural vital tooth by a plastic artificial tooth, to the method and apparatus for forming same, and to the improved polymerized article formed thereby.

It is well known, of course, that the natural average human tooth has an outer layer of enamel overlying a visually contrasting body material, and that the enamel, which is concentrated to form the incisal tip and overlies at least in part all of the other surfaces of the tooth, may vary in opacity between the substantially transparent and the merely translucent, but in all average cases being of varying thickness in overlying the body material and sufficiently light-transmitting as to permit the spectral distribution of the body material to be seen in varying degrees through the surfaces of the tooth. This creates a blended shaded appearance of the natural tooth.

In simulating the appearance of the natural tooth in a plastic artificial tooth, an approximation of similar visual effects of the blended shading are a primary consideration, but the problem is complicated both by commercial problems necessitating substantially assembly line production and the difficulty of associating differently shaded areas or volumes in blended relation in a production mold. It is the problem of shading and blending which has militated against the use of extrusion and transfer and like molding processes in the production of articles such as plastic artificial teeth.

In applicant's earlier patent, No. 2,454,847, there was disclosed an apparatus and a method for molding plastic artificial teeth, by means of which applicant's assignee, H. D. Justi & Son, Inc. has been able to establish and maintain an important position in the field of commercially produced plastic artificial teeth. The teeth produced in accordance with the invention of said patent were production line polymer products having excellent blending characteristics, and forming such close approximations visually of natural teeth as to have been accorded wide and favorable professional acceptance. Teeth as commercially produced under the said patent were formed of polymer in powdered form, disposed in a compact mass in a mold cavity, which mass was plasticized under heat and compressed by pressure effective against the contents of the mold cavity. These teeth so formed represented a great advance over any previously known plastic tooth as regards homogeneous integrity, and, of even greater importance, in blended shading of the two shades of polymer from which they were formed. However, the blending factor was evident primarily at the incisal tip and along the labial surface of the tooth. While still presenting a closer approximation of natural tooth blending and shading than had been attained theretofore, the "enamel" at the incisal tip blended into the body material substantially only on the labial surface, and the lingual surface and part at least of the mesial surfaces of the teeth partook solely of the visual aspect of the body material in a general line mergence into the incisal tip. Moreover, the parting line required careful flash-picking and polishing and even then was an obvious parting line in the mesial surfaces of the tooth. As the true simulation of a natural tooth must create the effect of enamel substantially throughout the transverse tooth periphery including the incisal tip and part at least of both labial, lingual and mesial surfaces, it will be apparent that the previous teeth mentioned, although eminently satisfactory, under critical analysis were less than complete simulations of complete vital natural teeth.

Moreover, according to the practices under said patent, using already polymerized polymer powder, the union of the particles in the solidified whole was by means of generally linear linkages only, so that certain solvents could effect a certain amount of penetration resulting in deterioration and disintegration, militating against the longevity of the teeth under certain conditions.

Previous efforts to polymerize the entire entity, so far as known have always resulted in a sharp line of demarcation between the two shades of the polymeric materials, which is the antithesis of blending and merging of one into another, and the bond between the portions was incomplete and subject to attack by solvents. Further, none of the hand packing procedures are available for the production of a commercial line of artificial teeth or like articles, because of the high labor cost, the impossibility of causing the complete molding of the articles to be a fully or partially automatic procedure, and the variations between the ultimate finished articles, among other adverse factors involved.

So far as known, no method or process and no machinery exists by which it is possible to polymerize two or more components of multishaded materials simultaneously in blended relation as a production line development.

It is among the major objects of this invention to provide means and a method of pre-shaping incompletely polymerized material preliminary to the ultimate shaping and polymerization thereof; to provide a mass of incompletely or partially polymerized material as a pre-shaped disc or unit for re-shaping with another mass of incompletely or partially polymerized material in the ultimate shape for and preliminary to polymerization; to provide a pre-formed solid disc of partially polymerized material of radially graduated thickness susceptible to deformation as a preliminary state of a boundary surface portion of an ultimately polymerized article; to provide a method and apparatus for forming polymerized artificial teeth by which an initial formation of a thin layer of incompletely polymerized material simulative of enamel is made, a separate layer of incompletely polymerized material simulative of the tooth body is disposed to overlie same, the layers are distorted and shaped in tooth form with the first layer forming part at least of the outer surface of the tooth form, and finally the polymerization of the unit thus shaped is effected; to improve the art of plastic teeth; to produce a new artificial tooth as a polymerized whole having homogeneity, better blended shading, more heat resistance and resistance to attack by solvents than has heretofore been possible; to provide a new method of shaping and polymerizing an article having shaded blended characteristics; to provide improvements in apparatus for shaping and polymerizing an article having shaded blended characteristics; to provide a separable mold having a mold cavity of variable contour to provide an incisal tip area, and a preformed disc of partially or incompletely polymerized material to overlie the mold cavity with graduated thickness so that a greater mass is disposed toward the incisal tip, whereby when the disc is secondarily shaped to conform to the appropriate mold cavity surface and backed up with additional incompletely polymerized material the incisal tip material is disposed in the incisal tip and extends substantially across either the lingual or labial surface of the tooth preliminary to or during polymerization of the entire contents of the mold cavity; to provide a method by which in whole or in part the molds and the apparatus shown in applicant's Patent No. 2,454,847 can be used in the polymerization of an artificial tooth; to provide a separable mold having complemental surfaces defining a plurality of mold cavities separated in the line of separation by spacing areas, for use with a plurality of generally planar discs of incompletely polymerized material arranged for "sandwiching" between the mold halves whereby when the halves are pressed together the layers are shaped to conform to the plurality of mold cavities and wherein the spacing area portions of the molds between the cavities compresses the layers to displace the juxtaposed portions of the layers laterally into the mold cavities to densify the whole preliminary to and during polymerization of the contents of the mold cavities; to provide a simple economical process for producing a more perfectly blended tooth or other object than has heretofore been considered possible; to provide a method for molding or shaping a tooth of two different plastics, having respectively different physical and/or chemical properties, so intimately associated that the polymerization thereof occurs simultaneously throughout the shaped mass with an interlocking and interspersion of cross linkages of the materials with a homogeneous end product substantially impervious to chemical attack; to provide a method and apparatus for forming polymerized artificial teeth which involves the initial formation of a thin layer of incompletely polymerized material simulative of enamel, the juxtapositioning and superimposing thereon of a separate layer of incompletely polymerized material simulative of the tooth body, shaping same into tooth shape, and polymerizing the shaped assembly as a unitary tooth; to improve the art of manufacturing plastic artificial teeth by producing a more homogeneous, more naturally shaded tooth polymerized as an integral unit; to provide a method of forming a tooth or other object, composed of two or more distinct plastics of different physical and/or chemical properties, so predisposed in precise and predetermined positions that all polymerizing occurs simultaneously throughout the assembly, so that if the tooth or other object is exposed to chemical attack, the respective plastics do not physically separate; to provide a method and apparatus for polymerizing shaded blended artificial teeth which is applicable to the formation of other polymerized units and articles in which blended shading is desired; to improve and minimize the parting line structure of polymerized articles; to provide artificial plastic teeth of smooth parting-line-free mesial surfaces; to provide plural layers of polymerizable materials for shaping and polymerizing of the shaped unit; to provide an improved artificial plastic tooth in which the incisal tip material is disposed between and extends beyond dentine material by which latter the polymerized tooth is partially bounded; to provide plastic artificial teeth in which by optical effects in the mouth of the users, more exact simulations of the natural vital teeth are effected; to provide improvements in molds, mold charging and molding; to cheapen the costs of molding; to reduce the amount of waste heretofore attaching to molds and molding processes; to provide improvements in molds and charging and molding processes by which wear on the mold parts is for all practical purposes precluded; to provide a mold which is self-contained having a pressure chamber equidistant from all mold cavities; to provide a molding process for plastic articles in which a plurality of mold cavities are subjected to identical molding pressures to secure uniformity of the products through internal expansion of gases; to provide a mold and a molding process in which a two-piece separable mold can shape and exert pressure upon plastic materials to polymerize them with a single compression between the mold pieces and without any other relatively moving parts.

In carrying out the invention in an illustrative form, a first mixture of a selected monomer and a selected polymer is made in a mass of generally dough-like deformable viscous consistency, which, when polymerized, has a predetermined visual aspect, illustratively, in the case of a tooth, that of enamel of a tooth. This mixture is pressed into a predeterminedly shaped generally self-sustaining but deformable incompletely or partially polymerized unit capable of overlying and extending substantially completely across a mold cavity in a separable mold. A second mixture of a selected monomer and a selected polymer is made in a mass of generally dough-like deformable viscous consistency, which, when polymerized has a different predetermined visual aspect from that of the first mass, and, illustratively, again in the case of a tooth, that of the dentine of the tooth. This second mixture is then preliminarily shaped and deformed into a second predeterminedly shaped generally self-sustaining but deformable incompletely or partially polymerized unit also capable of substantially overlying about one-half of the said mold cavity in the separable mold. The two units, or, if desired, and preferably, with the addition of a third unit shaped similarly to the first unit and formed from the same mixture, are then "stacked" and formed as a "sandwich" between the mold halves or portions, overlying the mold cavity. The mold portions are heated and the mold cavity-forming portions are forcibly brought toward each other, in the course of which the first layer is distorted to conform externally to the surface of the adjacent part of the mold cavity, and the third layer, if used, conforms to that surface of the mold cavity to which it is juxtaposed, and with the second or intermediate layer to fill the mold cavity. Those portions of the conjoint layers which are engaged between the mold areas adjacent to the mold cavity are extruded laterally into the mold cavity and against the shaped contents thereof to assist in condensing and compacting the mold cavity contents, and assisting in substantially obliterating the parting line of the entity. Additional force is made effective on the mold cavity contents to maintain the denseness and place the whole under pressure as the mold contents are polymerized as a simultaneously polymerized entity. As will be explained, the order of layer assembly can be varied.

In the accompanying drawings forming part of this description:

Fig. 1 represents a diametrical section through an illustrative shaping die of the invention with a mass of dough-like consistency disposed thereon, in the general center thereof prior to the controlled displacement and shaping thereof by the die in forming a layer of the ultimate composite of layers.

Fig. 2 represents the same section as Fig. 1, with the upper planar shaping die portion shown in elevation, in compressed juxtaposition thereto, with the mass of the layer material shown in section as the shape and disc into which the mass is displaced.

Fig. 3 represents a bottom plan of the shaped disc formed by the shaping dies of Fig. 2, as it is formed for ultimate positioning on the lower mold portion of the mold assembly.

Figure 4:
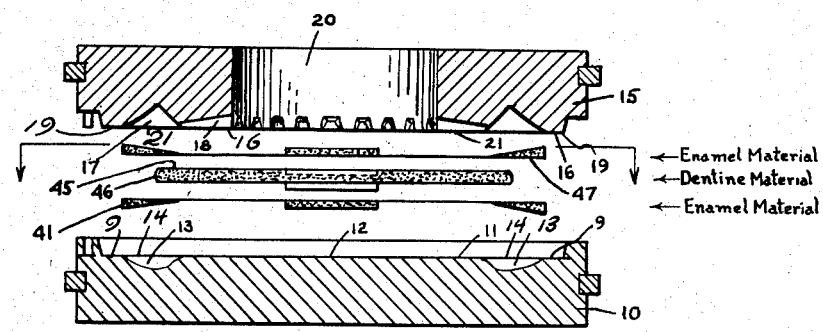

Fig. 4 represents an exploded section through an illustrative separable two-part tooth mold, by which the invention can be carried out, showing the components of the stack or tier of the three layers preferably used, disposed between the mold halves, with the disc of Figs. 2 and 3 trimmed to remove the extruded flange or flash, and extending peripherally about the mold half to substantially overlie each of the plurality of mold cavity depressions thereon while also being continuous over the spaces therebetween while the dentine layer is of smaller radius and overlies but a portion of the mold cavity.

Figure 5:
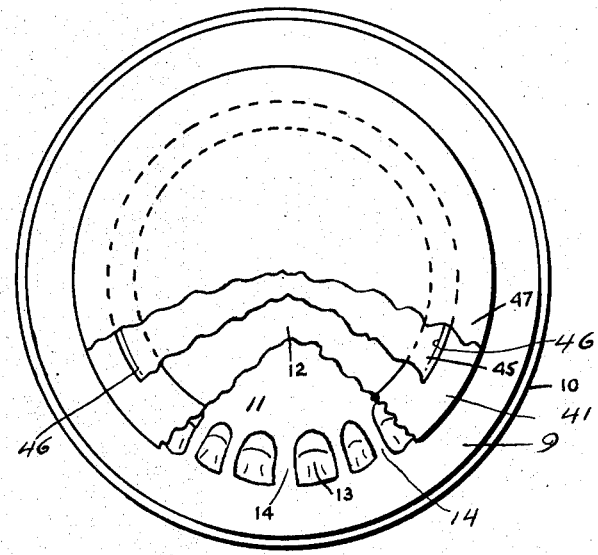

Fig. 5 represents a plan of the lower mold half of the illustrative mold, with the respective layers of the layer composite in intimate relatively overlying relation to each other and to the mold half, and broken away to show the relation of the layers and the nature of the structure of the mold portion, showing the mold cavity-forming recess in radial disposition in the mold half portion.

Figure 5A:
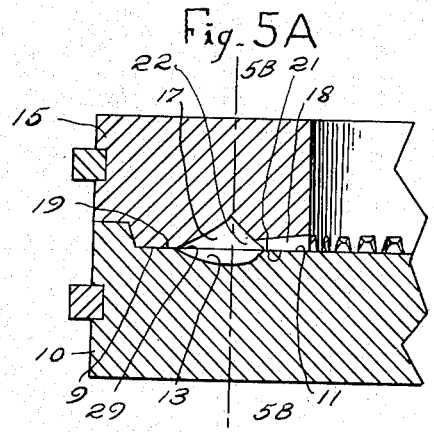

Fig. 5A represents a fragmentary enlarged section through the assembled illustrative mold prior to separation and insertion of the respective discs.

Figure 5B:
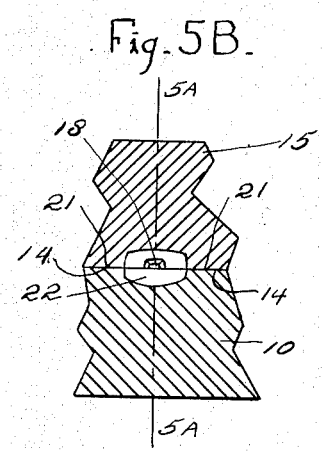

Fig. 5B represents a similar transverse section on line 5B—5B of Fig. 5A.

Figure 5C:
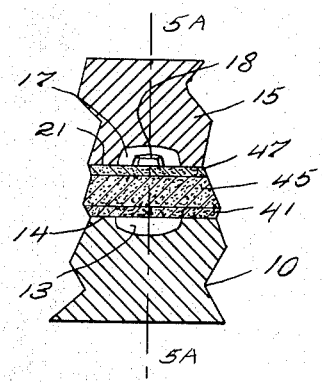

Fig. 5C represents the fragmentary section shown in Fig. 5B separated by the inserted disc layers prior to compression thereof.

Figure 6:
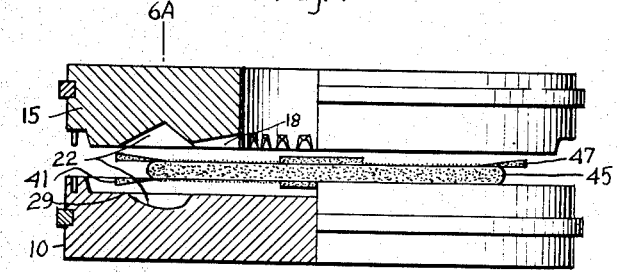

Fig. 6 represents an elevation, partially in section of the loosely assembled mold portions and the stack of discs or layers, showing in one illustrative assembly the relation of the latter to the respective surfaces of the mold cavity, shown for clarity in exaggerated size.

Figure 6A:
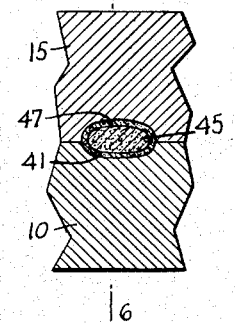

Fig. 6A represents a fragmentary transverse enlarged section on line 6A—6A of Fig. 6 after the latter has been closed and compressed against the disc, showing deformation of the disc inserts after such closure of the mold halves.

Figure 7:
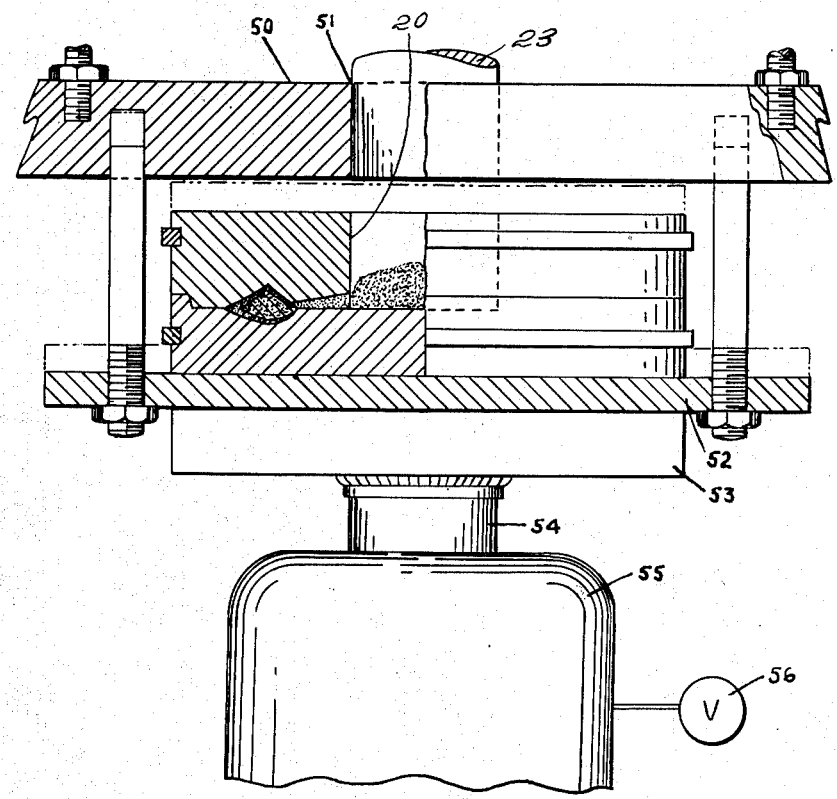

Fig. 7 represents a fragmentary side elevation of an illustrative press for heating and forcing one form of the mold portions together in distorting the assembled layers to fill the mold cavity shown in the section, indicating the "boil-back" of the polymerization material into the illustrative bore of the mold assembly, with the piston moving toward the lower end of the bore preliminary to forcing the bore contents to exert pressure on the mold cavity contents during the polymerization step, and with the return springs of Fig. 3 removed for clarity.

Figure 7A:
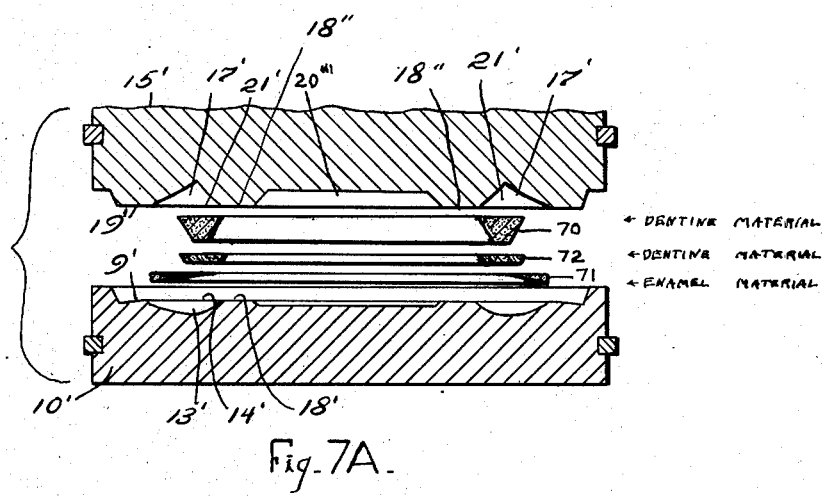

Fig. 7A represents an exploded section of a modified mold having a modified arrangement of superposed discs associated therewith and incorporating a sealed pressure chamber for molding a plurality of objects in completely closed mold cavities.

Figure 7B:
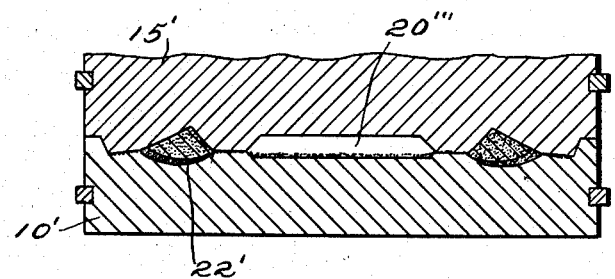

Fig. 7B represents a diametric section of the assembly of Fig. 7A in closed, polymerizing relation.

Figure 7C:
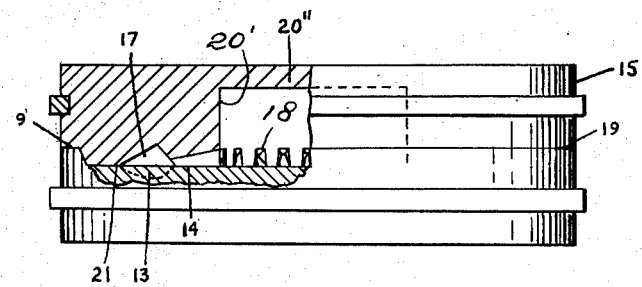

Fig. 7C represents a side elevation in partial section of a modified mold having a modified form of sealed pressure chamber.

Figure 8:
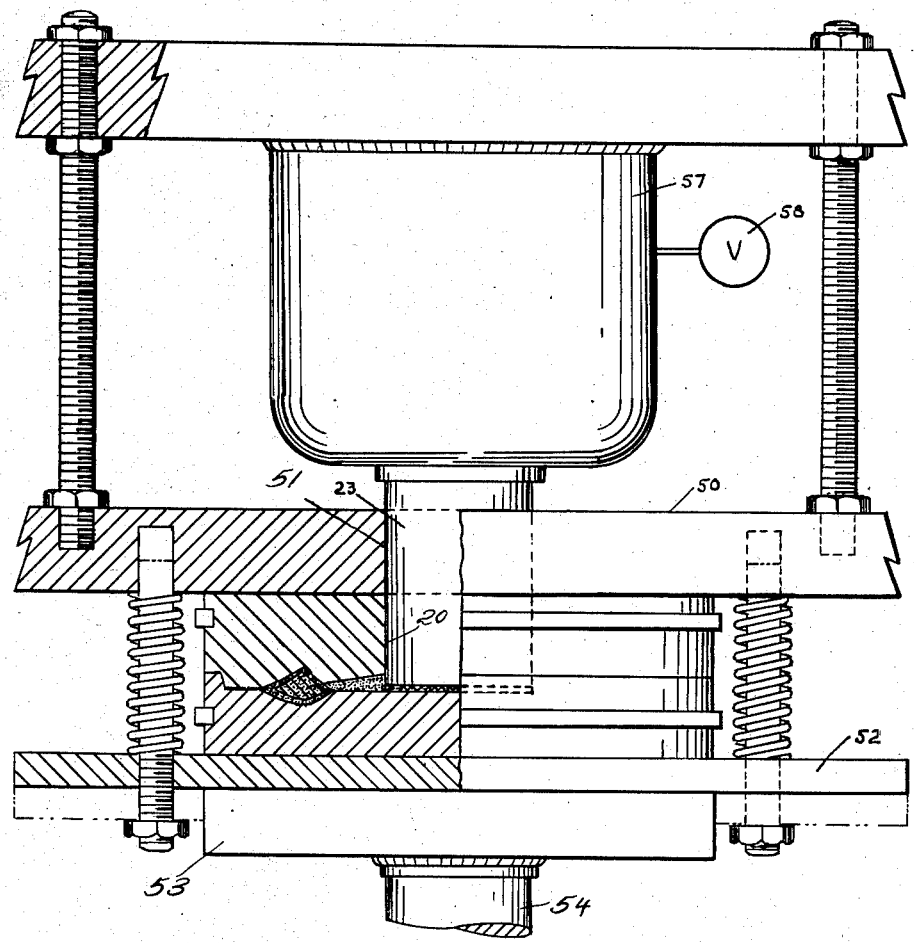

Fig. 8 represents a similar fragmentary side elevation of the press of Fig. 7, showing the completion of the piston stroke in the illustrative bore to complete the polymerization of the molded or shaped entity in the mold cavity.

Fig. 9 represents a longitudinal section through a molded blended polymerized tooth according to the preferred form of the invention, formed from three initial incompletely polymerized layers, comprising two enamel layers and a body layer, as disclosed in Figs. 4, 5, and 6, so that the labial, lingual and mesial surfaces of the tooth are of enamel joined at the incisal tip.

Figs. 10 and 11 represent transverse sections through the tooth of Fig. 9, at two spaced section lines 10—10 and 11—11 thereof.

Fig. 12 represents a longitudinal section through a molded blended polymerized tooth formed of an initial two layers, of the three layers shown in Fig. 7A, so that the enamel-forming material forms the incisal tip and part at least of the labial and mesial surfaces only of the polymerized tooth.

Figs. 13 and 14 represent transverse sections through the tooth of Fig. 12 at two spaced sections lines 13—13 and 14—14 thereof.

Figure 15:
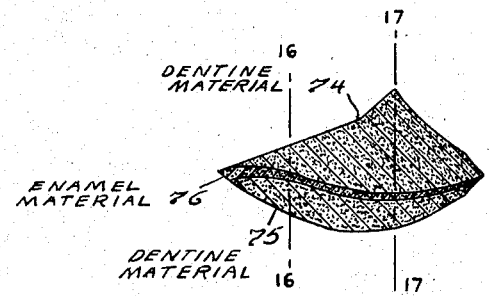
Figure 16:
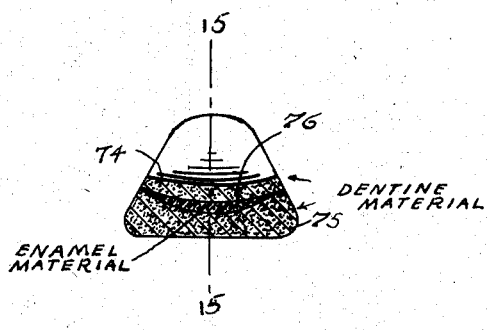
Figure 17:
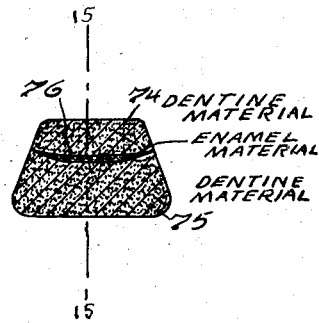

Figs. 15, 16, and 17 represent sections through a modified polymerized tooth, formed by the use of outer layers of dentine material sandwiching an intermediate or a plurality of intermediate enamel layers.

It will be understood that the invention is applicable to the production of any polymerized entity in which blended shaded characteristics in the superficial surfaces of the entity are desired, and in which the homogeneity and chemical and physical integrity of the polymerized entity are important. However, it will be recognized further that the prime exposition of the invention is in connection with an improved plastic tooth and the description which follows, while purely for example, will be directed toward such tooth formation.

By way of example of a form of separable mold of utility in the connection, reference may be made to the two-part mold shown in Figs. 4 to 9 inclusive. In essence, as a step toward the high production commercial formation of the illustrative teeth of the invention the mold is formed of a lower half 10, generally of cylindrical form, although this is not material, of usually solid metal capable of a reasonably rapid transfer of heat. The upper surface 11 of the mold half or portion 10 is illustratively planar as indicated and has a central area 12. This may be elevated in a short plateau, if desired. A series of semi-mold cavities or mold-cavity forming depressions 13 are formed in the planar upper surface 11, extending generally radially from and merging by upwardly sloped surfaces into the central area 12, being separated from each other by areas or spaces 14 in the plane 11 and bounded radially externally by peripheral planar surface 9. The upper half of the mold is formed of a complementally shaped and formed block of metal 15, having a lower planar surface 16, in which a plurality of semi-mold cavities or depressions 17 are formed, leading by the sloping sprue 18 into the axial bore 20 and peripherally separated by the areas or spaces 21 in the plane 16. Recesses 17 are bounded radially externally by peripheral planar surface 19. The semi-cavities 17 are complemental to the appropriate lower mold semi-cavities 13 to define therewith in registration and in assembly of the mold, the respective mold cavities generally designated as 22. It will be observed that the mold cavities are curved transversely and are each, illustratively, formed by upper and lower surfaces converging radially outwardly to define the relatively thin incisal tip molding end 29 opposite to the sprue or channel 18. In assembly of the mold parts, as the cavities or recesses register to form the closed mold cavities 22, the respective spaces or areas between the cavities, respectively 14 and 21 and 9 and 19, register to form compression surfaces between and beyond mold cavities. The molds as thus described are substantially identical with those described as preferred in connection with the invention of my said earlier Patent No. 2,454,847, so that the transition from the patented method to the method of this invention can be accomplished without material change in a major field of the present capital investment necessary for the purpose. As will be pointed out later, however, use of these specific molds is a present convenience, and is in no sense limitative. Additional mold forms of greater efficiency and economy will be pointed out, and any form of mold can be availed of by which the method can be carried out. The instant mold disclosure relies upon the passage of a piston 23 into the bore 20 in the polymerization process, as will be explained.

In addition to a separable mold, it is preferred to provide simple heat transmitting metal die members by which to pre-form the layers to be described. One exemplification is shown in Fig. 2. It comprises a lower die member 30 having an initially planar surface 31 in which there is formed an annular depression 32, illustratively sloping from a central area 33 in or below the plane of the surface 31, to a peripheral shoulder 34. This depression or forming space 32 is annular because the molds used as so far described are illustratively formed as cylinders. Of course, with any other disposition of the mold cavities than as radiating from an axis in the mold, the forming die depression will be changed to accord therewith, as will be pointed out. When the forming die illustrated is for the initial formation of a disc forming the enamel portion of the illustrative tooth, it is quite shallow, being exaggerated in Fig. 2, as shown, but preferably varying in depth from the plane 31 where it merges into the central plateau or recess with zero depth, through a depth of .002" to a depth at the shoulder 34 of .0025". These may be approximations, as with changes in layer order, deviations therefrom may be desired. Obviously, these proportions can readily be changed as can the shape or contour or proportions of the depression or the taper ratio, to accord with the particular requirements of the surface organization of the polymerized article being formed. The complemental die member 35 preferably has a lower planar surface 36, although as will be clear the surface may not need to be planar except possibly in part and may be complementally shaped to form a shaping recess when juxtaposed to the lower die member. For illustrative purposes, however, the upper die will be considered as a flat block capable of compressing inserted displaceable material to cause it to conform to the shape of the recess 32 in the lower surface and to the lower surface of the die member 35 on its upper surface.

In practicing the method of this invention, the selection of materials will be made in accordance with the desired predetermined result, but there is almost an infinite range of materials both in the thermosetting as well as in the thermoplastic types of synthetic resins and in mixtures thereof that may be used, and it may well be and is to be expected that as new polymerizable materials are developed by others, which materials are not at present even known, they will be found available for use in accordance with the broad aspects of the invention. It may be noted that the preferred materials used with the invention are the combination of a monomer, methyl methacrylate, cross linked with polyesters, and/or other cross linking agents such as divinyl benzine, diethylene glycol methacrylate, but other liquids or monomers can be used in combination with various elements of a wide range of the polymers, such as the polyesters, alkyds, allyls or other thermoplastic or thermosetting compounds occurring in liquid form, or combinations thereof.

It may be noted moreover that applicant has tested and used polymers and co-polymers, including monomers, of the following list:

1. Alkyds and allied resinous esters (formed by the reaction of polybasic acids with polyhydric alcohols with or without various modifiers).
2. Polyamides.
3. Vinyl resins (chloride-acetate).
4. Polystyrene (monomer and polymer).
5. Acrylic resins (methacrylic monomer and polymer).
6. Contact resins (co-polymers of unsaturated esters—doubly saturated monomers—allyl resins).

In the broadest aspect of the invention, the ultimate desired product is formed from any combinations of liquids and solids by which upon mixture a first and a second dough-like deformable or displaceable viscous mass can be created which can be given an initial selected or distorted shape as an incompletely, although possibly partially, polymerized entity of relatively self-sustaining but distortable form, so inherently or deliberately shaded, tinted, colored, opacified, clarified, or otherwise, that either mass when polymerized effects a visual aspect usually predeterminedly related to but different from the other, and capable of polymerization with cross linkages to form a homogeneous uniformly dense substantially solvent-proof polymerized entity.

With such range of useable ingredients the procedure according to applicant's method is as follows: a desired or necessary amount of the selected polymer is placed in a jar or like mixing chamber, to which is added the selected monomer, in the proportions of approximately one half by weight of the polymer. The polymer and monomer combine by stirring or other agitation, and when the mass attains a substantially dough-like and deformable or displaceable more or less viscous consistency the agitation is stopped. The mass thus formed is assumed to be the material which is going to be used to form the incisal tip and part at least of the labial and mesial surfaces, and in the preferred three layer type of "sandwich" also is assumed to be the material which is going to form part of the lingual and mesial surfaces as well as part of the incisal tip material, and therefore the monomer and polymer of which it is comprised should be such, when polymerized, as to be capable of at least partially transmitting light, in certain cases being predeterminedly substantially transparent, and in others being merely translucent. A second mass is similarly formed from a selected monomer and polymer, which is prepared so that when polymerized it partakes of the visual nature of the relatively opaque dentine material of the illustrative tooth, in contrast with the visual aspect of the illustratively less opaque incisal tip material.

A portion of the first mass is deposited, as at 40, on the upper surface of the lower die 30 substantially in the center thereof, and the upper die member 35 is then relatively forced thereagainst until the upper and lower dies are in substantial contact. The complete die is then placed in a hot press (180° F.) and under compression which is maintained for five seconds, after which the composite die is released, removed, and opened. This provides the disc 41 shown in Figs. 2 and 3, usually having a thin more or less flash-like central web 42, the radially tapering body portion 43 and the thin flash-like margin 44, which is preferably trimmed off prior to use in the mold. The thin central web 42 may be retained and be built up as shown, or it may either be trimmed out, or may be omitted from the shaping by minor changes in the forming dies, as will be clear. In other words, the disc 41 may have diametric integrity, or the central portion may comprise an aperture. As the disc at this stage is somewhat form-retaining, without being polymerized, which state maintains for a considerable time (until it loses the viscosity which maintains its adaptability to deformation), it will usually be found expedient to form a multiplicity of the discs at one time or from one initial mass of the dough-like consistency. These discs are disposed in any desired manner to prevent accretion of dust and the like thereon, for use in a succession of molding or shaping steps.

If the third or upper disc 47 of the three-layer assembly, forming illustratively the lingual surface of the finished tooth, is used in the method, as is preferred, it will usually be a little thinner and have less taper than the disc 42, although, if desired, it may be identical with disc 41, as shown in Fig. 4 and the related figures, and is formed in a similar or the same die.

Upon suitably shaped die or forming members, obviously modified from that disclosed in Figs. 1 and 2 to form a different and axially larger disc, a given mass of the second mixture is placed, compressed, displaced, heated, and removed, as has been described of the first disc, to form, preferably, a plurality of intermediate discs 45. The disc 45, which may be generally planar except for a depression or an elevation as shown, or an axial aperture in the center, is preferably tapered at the edge, as shown at 46, and is of smaller diameter than layers 41 and 47, so that there is a reduced amount of dentine material adjacent to the incisal tip-shaping surfaces 29 of the mold cavity 22.

The step of forming the discs having been completed, and it will be apparent that in production this formation may be made completely automatic, if desired, and a suitable number being on hand, the method then involves for each particular separable mold operation, the following:

The mold is separated and on the upper surface of the lower half 10 there is laid the three layers, so that the lower layer 41 is adjacent to the lower mold 10, the intermediate layer 45 overlies layer 41, at least in part, and the upper layer 47 overlies the layers 45 and 41. The layers, of course, may be applied successively, or as a compound unit, and in the production line of development will be fed onto the lower mold half as a composite unit.

It is preferred that one at least of the upper and lower layer extend completely over and across the mold cavity portions or depressions 13 in the mold half 10 to overlie the peripheral compression area, whereas the intermediate layer is not so extensive, and further that in the initial relatively form-retaining condition of the disc they extend in general planes parallel with the surface of the mold half in part at least continuous over the entire plurality of mold recesses 13 and also over all of the spaces or areas 14 therebetween, and partially, usually, over the peripheral area 9, and with the lower layer 41 spaced from and out of contact with the lower surfaces of the recesses 13. It will be observed that with the preferred radially tapering enamel discs either 41 or 47, the thickened ends or edges are juxtaposed substantially with the incisal tip forming end 29 of the mold cavity 22.

It will also be evident that in the preferred tooth formation layer assembly shown, the intermediate dentine layer is appreciably thicker than either of the enamel layers. With the enamel layers being of the order of between .002" and .0025", the intermediate layer 45 of dentine material is of the order of ¼". It is preferred in the illustrative tooth form of the invention that the layers when closely packed together have an aggregate thickness not smaller than the vertical dimensions of the assembled mold cavity 22, although owing to the added packing functions attaching to the lateral extrusions effective on the mold cavities, a thinner assembly of layers may be found to be effective for the molded shaped article. It is preferred, however, to have added thickness in order to compensate somewhat for the shrinkage attendant upon the polymerization step. It may be pointed out that any or all of the respective discs may be formed with rudimentary shapes so that the material registering with mold cavities is initially thicker than where it registers with compression areas adjacent to mold cavities.

The layers having been arranged over the lower mold half, the upper mold half is then placed thereover with the respective mold cavity-defining recesses in vertical registration, separated from the lower mold defining-recess by the interposed layers. The assembly of mold halves and layers is then placed in a heated press, formed illustratively by the upper stationary anvil member 50 having the central aperture 51, and the lower movable plate member 52. The latter is supported upon the pressure plate 53 mounted on the piston member 54 actuated by pressure in cylinder 55, and illustratively controlled by the valve 56. A second pressure cylinder 57 is provided controlled as by a valve 58, to actuate the plunger piston 23, movable through the plate aperture 51 and into the registering bore 20 in the upper mold portion.

The temperature of the press is maintained at approximately 180° F., and after insertion of the mold and layer assembly therein valve 56 is actuated to force the plate 52 toward the anvil. A pressure of approximately 2000 p. s. i. is made effective on the respective mold portions forcing them together. This pressure compresses the discs, forcing them to distort to fill the mold cavities, without appreciable disturbance of the laminar nature and disposition of the outside layers. The pressure distorts and deforms both discs or all three discs when the latter assembly is provided, causing the lower disc 41 to conform to the lower surface of the mold recess 13 to form a portion at least of the labial surface of the ultimate tooth while concentrating a mass of the same layer in the incisal tip 29 of the complete mold cavity. Similarly the upper layer, if used, or the intermediate or dentine layer, if used alone without an upper layer, is caused to be distorted and deformed to contact the upper surface of the mold recesses 17, to form the ultimate lingual surface of the tooth, while merging said upper layer 47 into the concentration of enamel material at the incisal tip end 29 of the mold cavity 22. At the same time that the registering portions of the respective layers have been deformed and distorted to fill the mold cavities, the portions of the layers registering with the areas between and beyond the cavities comprising the registering areas 14 and 21 and 9 and 19 respectively, place the said layer portions under high compression with a consequent lateral dispersion against the contents of the mold cavities around the entire lateral periphery of the shaped entity at the parting line, other than at the root end or neck thereof. This latter is a modified form of extrusion which compacts the material in the mold cavities and densifies same and not only insures that during polymerization there is no shrinkage of the mold cavity contents, but also by forcing the extrusion into the mold cavity it assists in reducing the parting line effect to negligibility by reducing flash and forming mesial surfaces having practically indiscernible parting lines. While the compression maintains on the mold and its contents, valve 58 is gradually opened and the piston 60 is relatively slowly forced into the bore 20. This ultimately attains a pressure therein of approximately 500 p. s. i. This forces the expanded mass which has pushed back through the sprue channels 18 into the bore to compressed compaction exerting pressure back through the sprue channels and against the neck end of the shaped mass in the mold to maintain the volume and denseness thereof during the polymerization, and to insure the avoidance of voids in the polymerized shaped mass. The said two respective pressures are both maintained for from seven and one-half to eight minutes, or sufficient time to complete polymerization of the material, when they are released by actuating both control valves. The mold is removed from the hot press and placed in a cold press, at approximately 36° F. and the mold is again brought under compression for approximately 15 seconds, while the polymerization is set. It will be clear that these presses can be the same press having a fluid flow system by which selectively and successively hot fluid can pass through the press to achieve polymerizing heat on the mold halves during the proper compression thereof for the proper recited period, after which without removing the assembled mold, the cold fluid is caused to flow through the press to chill and set the polymerized units.

After polymerization, the pressure is released, the mold is opened and the tooth "daisy" or other plural or single object is removed, which needs but the removal of such slight amount of flash as may attach during the process, and slight polishing to form the desired end polymerization product.

The result is a perfectly polymerized, perfectly formed, physically and chemically blended tooth, or other object, of great homogeneity, the structure of which can be completely or partially cross-linked and more or less impervious to attacks by solvent. When the article is a tooth, it will be seen by reference to Figs. 9 and 10, and 11, that the enamel incisal tip 60 and part at least of the labial surface 61 and the mesial surface 59 are formed from the layer 41, and the lingual surface 62, and part of the mesial surface 59 and part of the incisal tip 60 is formed by layer 47, whereas the dentine of the tooth 63 is formed from the dentine material 45. It is important to note that with this type of assembly the entire perpihery of the tooth, at least adjacent to the incisal tip, is formed of enamel material and thus more nearly approximates the natural tooth in its structure.

In the case of a two-layer disc assembly, utilizing the lower layer 41 and only the body material layer 45, or the three layer assembly of Fig. 7A, the finished tooth as shown in Figs. 12, 13, and 14 has the incisal tip 65 and part of the labial surface 66 and part of the mesial surface 69 formed from the lower layer 41, while the dentine of the tooth 68 and the lingual surface 67 and part of the mesial surface 69 is formed of the dentine material layer 45 or layers 70 and 72 of Figs. 7A and 7B. In this case, it will be observed that owing to the conformation of the layer 41 to the surfaces of the mold cavity grooves 13, the labial surface extends peripherally completely about one half of the tooth merging into the dentine material only at the sides above the incisal tip in the mesial surfaces, and this is for many purposes a completely satisfactory form of tooth.

In both cases it will be observed that a completely blended shaded tooth is provided. The blending is as a result both of the relative light-transmitting character of the "enamel" material, which, being of graduated thinness, and extending either completely or only partially along the labial and lingual surface of the tooth, transmits more of the dentine material aspect where thin than where it is thicker.

It is pointed out that the use of the molds and presses as presently preferred are for convenience the molds of the said earlier patent, which require the use of a supplemental piston or like device in the bore 20 of the molds. In the utilization of the invention, however, it is desirable to eliminate working parts, to preserve the life of the molds, and reduce the amount of material used. In the modified forms of the invention disclosed in Figs. 7A and 7B, and in the further modified form shown in Fig. 7C, important advances in the mold art are achieved. In Fig. 7C, the molds of the said patent are modified so that a closure web is placed across the upper end of the bore 20', as at 20''. This constitutes the bore 20' as a pressure chamber in which entrapped air, alone, or reinforced with added pressure ingredients such as water to form steam, an expansive gas such as $CO_2$ in dry form, or other booster factors, may be added. It is perfectly operative with mere entrapped air. All other elements are the same and bear the same reference characters as in the earlier forms of mold. It will be understood that the gas pressure in the closed chamber 20', increasing with compression and heating, pushes back against the material in the sprue channels 18' to consolidate and densify the materials in the mold cavities during polymerization. The device of Figs. 7A and 7B is similar to that of Fig. 7C, in the fact of the presence of a central short confined generally axial pressure chamber 20''' jointly formed by the complemental surfaces of the upper and lower mold portions 15' and 10' respectively. There is in this form of the device, however, a further important change in the structure.

It has been shown that with a mold cavity 22, as described above, surrounded on three sides, the last stages of compression of the mold halves together effect a sort of extrusion, forcing the compression - area - engaged compressed layers laterally into and against the contents of the mold cavities, while the remaining end of the mold cavity was placed under compression either by the inserted piston of the early figures or the compressed gas in the bore 20' of Fig. 7C. As a further refinement of the mold and of the molding process, using carefully calculated disc volumes, as affected by the percentage shrinkage factor, the mold of Figs. 7A and 7B can be used.

In this case the mold halves are generally similar to the other forms described except that each partial mold recess 13'' forming the ultimate cavity 22'' in the lower mold half 10'' is disposed as a complete recess entity, completely surrounded by the compression surfaces 14', between each side laterally of each semi-mold cavity 13', and by the co-extensive end compression surfaces respectively 9' and 18'. The surfaces 14', 9', and 18' are continuous about the semi-mold cavity 13'. The upper mold portion 15' is provided with the semi-mold cavities 17' for respective registration with the appropriate semi-mold cavities 13', and are each completely surrounded by the compression surfaces 21', disposed on both sides of and between each semi-mold cavity 17' and the adjacent one of the series, and by the end compression surfaces 19' and 18''. Compression surfaces 21', 19', and 18'' are continuous about each recess 17'. It will be understood that as the respective registering semi-mold cavities 13' and 17' register to form the complete closed mold cavity 22', the respective compression surfaces register to surround the mold cavity with compression portions. However, the complemental end surfaces 18' and 18'' are relatively short, and lead into the pressure chamber 20'''. With a mold as described, with fairly carefully calibrated or calculated volumes of the incompletely polymerized discs, disposed between the mold portions, and again which discs may be preliminarily shaped in whole or in part to be thicker in the line of registration of the semi-mold cavities than the intermediate portions for registrations with the compression areas, the bringing of the heated molds together will distort and shape the assembly of layers to fill the mold cavity as it is decreased in effective volume as the parts of the mold are forced closer together to maintain the pressure on the mold cavity contents. At the same time, as the mold halves are forced together the compression areas approach each other and force the entrapped portions laterally into and against the mold cavity contents on all sides of the mold cavity. This is augmented by the ultimate increasing back pressure against the flash-like compressed material between surfaces 18' and 18'' from the pressure chamber 20''', which exerts the final ultimate densifying concentration in the mold cavity 22'. The result is a similarly homogeneous compacted tooth or other article, polymerized as a unit, which has no sprue, forms no "daisy," and requires no separating of the respective polymerized articles from each other nor from any waste portions, other than the slight flash that may attach to the articles. As this flash is readily removed in a tumbling and polishing step, it will be seen that the cost hitherto attaching to less satisfactory polymerized molded articles is appreciably diminished by the use of the mold last described. Because it is not necessary to provide material for filling sprues, bores, or other components, the amount of material necessary to place in the respective discs is a minimum, and therefore appreciable savings in material are also accomplished thereby.

This is exemplified by the disc formations shown in Fig. 7A. In this illustrative form of the assembly and method, the dentine material is formed of two discs shaped as respective annuli, 70 and 72, of which the upper, 70, is of heavy cross section and the element 72 is smaller, and having illustratively the general relative shapes and dispositions shown. The lower disc, 71, is also shaped as an annulus formed of the enamel material. It will be observed that these three respective members are centrally apertured, so that the material is concentrated in the general lines of the isolated mold cavities 22'. The polymerized material as shown in Fig. 7B is almost identical with the end result of using a single dentine disc and a single enamel disc, except that the blending is better. The end result is similar to that shown in Figs. 12, 13, and 14.

In using the mold of Fig. 7A, it is preferred that a rearrangement of the press of Figs. 7 and 8 be made, whereby the piston of one press becomes temporarily an anvil for the other piston, so that a preliminary compression of the mold portions can be made, illustratively, of 300 p. s. i., for about a minute and a half, while the heat is maintained in the mold at approximately 250°. Then the other piston is actuated with a final compression of approximately 2000 p. s. i., during which the final polymerization is completed with the assistance of the high pressure engendered in the pressure chamber 20'''.

A tooth of different aspects, but which in many ways, especially in the mouth of a patient, is, optically at least, more nearly a visual simulation of the natural tooth is formed by a simple rearrangement of the discs. In this case, two discs of dentine material are disposed outwardly at the top and bottom of one or more intermediate discs of enamel material. It is preferred, according to the desired effects, to shape the discs so that the illustratively outward thick edge of the enamel is adjacent to the incisal tip end of the mold cavity and tapers inwardly toward the neck end, and by providing the dentine discs as reversely tapering to a thin outward end adjacent to but preferably slightly spaced inwardly from the incisal tip end of the mold cavity. With such disc organization and assembly, as shown in Figs. 15, 16, and 17, a tooth is shaped and polymerized with the dentine material 74 and 75 forming parts of the labial, mesial and lingual surfaces, merging and blending into an incisal tip formed of the enamel 76. The transfer of respective shade qualities between the discs assists in creating the blending of the shades which is so natural and so desired in the polymerized product. The reversal of the parts, i. e., the discs, as just described, has another interesting factor in the mouth of the user. With the mouth closed and only exposing the incisal tips of the natural teeth, a rather grey aspect is seen, and the tooth just described simulates this effect to a remarkable degree.

Wherever the term "mesial" appears herein, it is to be understood that "mesial and distal" are included.

The advantages of the invention and the improvement in the polymerized shaped unit effected herein over any of the prior art devices, especially as applied to plastic teeth, will be clear. It will also be clear that within the broad aspects of the invention many changes may be made in the mold forms, as, for instance, square or oblong or like mold cavities may be used, changes may be made in the particular polymerizable materials available, and in the steps in the method, as well as in effecting changes in the polymerized end result, may be made by those skilled in the art, and all such changes are to be construed as within the scope of the invention, unless otherwise precluded by the definite limitations of the appended claims.

Having thus described my invention, I claim:

1. The method of producing an artificial tooth using a plural part mold, one part of which defines the labial surface and the other part of which defines the lingual surface of a tooth mold cavity having a longitudinal axis substantially intersecting an incisal tip formed at the junction of the labial and lingual cavity surfaces, which comprises forming and shaping from incompletely polymerized material a unit of enamel simulation the cross section of which in one direction is of non-uniform thickness, said unit having an extent in a direction transverse to said one direction greater than that of the mold cavity, juxtaposing said unit to said one mold part substantially overlying its said labial surface with its said one direction generally parallel to said longitudinal axis and with said unit extending laterally across and beyond the labial surface of the said one part out of conformance with said labial surface with a relatively thin portion of the non-uniform thickness spaced from the incisal portion of the labial surface, forming from incompletely polymerized material a polymeric dough simulative of dentine, disposing said dough between said unit and the lingual surface of the other part of the mold and pressing said dough against said unit to force the unit into external conformance with the labial surface of the mold cavity and shaping a compact tooth form with non-uniform thickness of enamel simulation longitudinally of the labial surface including the incisal portion thereof as a substantially discrete relatively thin unit backed by relatively thicker dough, and completing the polymerization of the shaped tooth form as a unitary homogeneous polymerized tooth.

2. The method of molding a tooth in a separable mold having a mold cavity of which the labial and part at least of the incisal surfaces are in one portion of the separable mold, which comprises forming a dough-like mixture of a selected polymer and monomer to form enamel simulation, shaping said mixture into a unit with a general longitudinal taper and a width greater than the width of said mold cavity, superposing said unit on said one portion to overlie and extend laterally across and beyond but out of complete conformance with the mold cavity labial surface with a relatively thick portion of said unit substantially juxtaposed to the incisal portion of the labial surface of said one portion, forming a second dough-like mixture of a selected polymer and monomer to form dentine simulation, disposing a mass of said second mixture in abutting contact with said unit and with the complemental mold portion, subjecting the mass to pressure to force the unit into contacting conformance with the labial mold surface and shaping the mass to substantial conformance with the mold cavity surface of said complemental mold portion while generally maintaining the discrete character of the unit and said mass with inappreciable flow between the unit and said mass, and polymerizing the entire mold cavity contents as a homogeneous entity.

3. The method of molding a shaded artificial tooth utilizing a separable mold defining in assembly a tooth cavity having a longitudinal axis and an incisal tip surface spaced longitudinally on said axis a predetermined distance from a given mold point of reference, which comprises forming from incompletely polymerized enamel simulation a relatively viscous generally self-sustaining shaped layer having longitudinal spacing from its marginal edge to a given layer point of reference at least equal to said mold predetermined distance and generally tapering inwardly from its said marginal edge and of greater width than the width of said mold cavity, disposing said layer in contact with one mold portion while the mold is separated to overlap said cavity on both lateral sides thereof and with said respective points in substantial registration to substantially juxtapose said marginal edge to said incisal tip surface, forming from incompletely polymerized material a mass of dentine simulation, disposing said mass in contact with the layer between the layer and the mold cavity surface of the other mold portion, exerting pressure on the dentine simulation effective between the mold cavity surfaces of the other mold portion and said layer as the mold portions are brought together and thereby forcing the portions of the layer encompassed by the mold cavity into conforming contact with the mold cavity surface of the mold portion to which the layer is juxtaposed and filling the mold cavity, and polymerizing the mold cavity contents into a homogeneous unit.

4. The method of simultaneously molding a plurality of relatedly shaded artificial teeth utilizing a separable mold defining in assembly a plurality of individual tooth mold cavities in an arcuate series, each cavity having a longitudinal axis substantially radial of a common center and with their respective incisal tips extending in a direction away from said common center and in general peripheral alignment in an arc formed about said common center, which comprises forming a relatively viscous generally self-sustaining arcuate layer from incompletely polymerized enamel simulation material with said layer having a peripheral marginal edge generated about a layer center on a radius generally similar in extent to that of the incisal tips of the mold cavities about the mold common center, said layer tapering inwardly partially toward said layer center, the arcuate extent of the layer being at least equal to the arcuate extent of the entire series of mold cavities, disposing said layer on one mold portion while the mold is separated with the common center of the mold and the center of the layer in general registration, forming a mass of dentine simulation form incompletely polymerized material, disposing said mass between said layer and the other mold portion, forcing the mold portions together and thereby forcing the portions of the layer encompassed by the respective mold cavities into conforming external contact with the labial cavity surfaces of the mold portion to which the layer is juxtaposed by pressure of the dentine simulation as the dentine simulation is substantially conformed to the cavity surfaces of the other mold portion and with the mold encompassed layer portions to fill the mold cavities, and polymerizing the mold cavity contents into unitary homogeneous shade-blended artificial teeth.

5. The method of producing a polymeric shade-blended artificial tooth having a dentine-simulating body and lingual surface, and a labial surface of enamel simulation extending from one mesial or distal surface to the other across the labial surface and of varying thickness longitudinally of the tooth with a relative thick portion of the enamel simulation adjacent the incisal portion of the labial surface, utilizing a separable mold defining in assembly a tooth mold cavity having a parting line in the mesial, distal and incisal surfaces of the cavity, of which one portion contains the labial surface, which comprises forming from incompletely polymerized material a flexible substantially self-sustaining deformable layer of polymeric enamel-simulating material having a general taper in one longitudinal dimension and being wider than half the total ultimate tooth periphery extending between and across the mesial and distal surfaces thereof in the other dimension transverse of the longitudinal dimension, forming from incompletely polymerized material dentine simulation, shaping the dentine simulation substantially into the contour of part of a tooth of greater average thickness than the average thickness of said layer, disposing said layer in contact with said one portion of the mold extending across both sides of the mold cavity with incomplete external conformance thereof to said labial surface of its mold cavity portion while the mold is separated, disposing said dentine simulation in contact with said layer in registration with the mold cavity surface of the other mold portion, bringing the mold portions together and thereby bending the layer about the dentine simulation and into external conformance with the labial surface of the mold cavity to complete the tooth and to form the external surface and contour of the other part of the tooth, with a relatively thick portion of the tapered layer adjacent the incisal tip, reducing the excess portions of the layer adjacent the mesial and distal surfaces of the tooth to mere flash, and polymerizing the composite tooth to form a homogeneous polymerized unit.

6. The method of polymerizing shade-blended artificial teeth utilizing a separable mold defining in assembly a tooth-shaped mold cavity having an incisal tip and a longitudinal axis, which comprises forming from incompletely polymerized material a first polymeric dough visually simulative of tooth enamel when polymerized, forming from incompletely polymerized material a second polymeric dough visually simulative of tooth dentine when polymerized, shaping the first dough under pressure into a generally self-sustaining unitary layer generally tapered in a first major dimension and being of substantially uniform thickness and wider than said mold cavity on any secondary major dimension substantially normal to the first dimension, disposing the shaped layer across the mold cavity against one mold portion while the mold is separated with the general taper dimension of the layer substantially parallel to the longitudinal axis of the mold cavity and with a relatively thick portion of the taper adjacent to the incisal area of the labial surface, disposing a relatively thick portion of the second dough as contrasted to the thickness of said layer between the shaped layer and the complemental mold portion, forcing the mold portions together and thereby forcing the layer into external conformance with the interior surface of the mold cavity of the mold portion to which it is adjacent by pressure from the second dough, filling the mold cavity, and polymerizing the entire mold cavity contents.

7. The method of simultaneously polymerizing a plurality of shade-blended artificial teeth utilizing a separable mold defining in assembly a plurality of individual spaced tooth-shaped mold cavities each having an incisal tip and a longitudinal axis, which comprises forming from incompletely polymerized material a first polymeric dough visually simulative of tooth enamel when polymerized, forming from incompletely polymerized material a second polymeric dough visually simulative of tooth dentine when polymerized, shaping the first dough under pressure into a generally self-sustaining unitary layer at least as wide as said plurality of mold cavities and intermediate spacings therebetween generally tapered in any first major dimension and being of substantially uniform thickness on any secondary major dimension generally substantially normal to a first dimension, disposing the shaped layer against one mold portion to extend across the respective labial surfaces of the plurality of mold cavities and their respective intermediate spacings while the mold is separated with incomplete external conformation thereof with said respective labial surfaces, with given first major dimensions of the layer substantially parallel to the respective axis of each mold cavity, disposing a portion of the second dough of greater average thickness than that of said layer between the shaped layer and the complemental mold portion, forcing the mold portions together and thereby forcing the shaped layer into external conformance with the labial surfaces of the respective mold cavities of the portion to which it is adjacent by pressure from the second dough and filling the mold cavities, and polymerizing the entire contents of the mold cavities.

8. The method of polymerizing shade-blended artificial teeth utilizing a separable mold defining in assembly a tooth-shaped mold cavity having an incisal tip and a longitudinal axis, and a parting line in the mesial and distal and incisal tip areas of the mold cavity, said mold cavity parting line in said mesial and distal areas at least being defined by complemental compression areas on the respective mold portions, which comprises forming from incompletely polymerized material a first polymeric dough visually simulative of tooth enamel when polymerized, forming from incompletely polymerized material a second polymeric dough visually simulative of tooth dentine when polymerized, shaping the first dough into a generally self-sustaining deformable unitary layer generally tapered along one dimensional line while being wider than the width of the mold cavity and said compression areas and of substantially uniform thickness on each transverse dimensional line, disposing the shaped layer across the mold cavity in contact with the compression areas while the mold is separated with the one dimensional line generally parallel to said longitudinal axis and with a relatively thick portion of the taper adjacent the incisal tip, disposing a mass of the second dough thicker than said shaped layer between the layer and the complemental mold areas of the other mold portion, forcing the mold portions together and thereby forcing the shaped layer into external conformance with the interior labial surfaces of the mold cavity of the mold portion to which it is adjacent by pressure from the second dough and filling the mold cavity, and substantially severing the layer at the mesial and distal portions of the mold cavity by action of the complemental compression areas, and polymerizing the mold cavity contents into a homogeneous tooth.

9. The method of producing an artificial tooth, using a plural part mold defining a mold cavity having labial, lingual and incisal tip surfaces, which comprises forming from incompletely polymerized material a substantially resilient layer of visual aspect simulative of enamel and of generally tapered cross section in one dimension and wider than said tooth cavity, juxtaposing said shaped layer to the labial surface of the mold cavity while the mold is separated with a relatively thick portion of the tapered section adjacent to the incisal tip surfaces of the cavity as the only material at the incisal tip and extending in both directions laterally beyond said mold cavity, placing a mass of incompletely polymerized material of visual aspect simulative of dentine against said layer between the layer and the lingual surface of the mold cavity, closing the mold so that said mass forces said layer into continuous contacting conformation with the labial and incisal tip surfaces of the mold cavity and is itself shaped by the lingual surfaces thereof in a complete tooth form, and heating the mold to polymerize the shaped tooth form in which the labial and incisal tip surfaces are formed by said first layer.

10. The method of producing an artificial tooth, using a plural part mold defining a mold cavity having labial, lingual and incisal tip surfaces, which comprises forming and shaping a first and a second substantially resilient unit of incompletely polymerized material into layers of which one at least is of generally tapered cross section in one dimension and wider than the mold cavity in another dimension, forming a third unit from incompletely polymerized material of contrasting visual aspect relative to the first unit, placing said third unit between said layers with the respective layers juxtaposed to the mold cavity while the mold is separated with said one layer extending laterally across the mold cavity, a relatively thicker part of said tapered portion being adjacent to said incisal tip surface and said third unit being spaced from said incisal tip surface longitudinally of the mold cavity, forcing said mold portions together and shaping the ultimate tooth wherein the first and second layers are forced respectively to conformation with the labial and lingual surfaces of the mold cavity and into the incisal tip, and completing the polymerization of the tooth form resulting from closing of the mold.

References Cited in the file of this patent

UNITED STATES PATENTS

| Number | Name | Date |
| --- | --- | --- |
| 1,191,637 | Whiteley, Jr. | July 18, 1916 |
| 2,326,531 | Gates | Aug. 10, 1943 |
| 2,368,721 | Moskey | Feb. 6, 1945 |
| 2,380,468 | Saffir | July 31, 1945 |
| 2,419,084 | Myerson et al. | Apr. 15, 1947 |
| 2,474,676 | Kelly | June 28, 1949 |
| 2,491,097 | Feagin | Dec. 13, 1949 |
| 2,514,076 | Kelly | July 4, 1950 |
| 2,554,845 | Thornton | May 29, 1951 |

FOREIGN PATENTS

| Number | Country | Date |
| --- | --- | --- |
| 514,830 | Great Britain | Nov. 20, 1939 |